June 2, 1931. H. KÜCHENMEISTER 1,808,046
FILM OF MAGNETIZABLE MATERIAL FOR EPISCOPIC PROJECTION
Filed Jan. 30, 1928

HEINRICH KÜCHENMEISTER
INVENTOR
BY Knight Bros.
ATTORNEYS

Patented June 2, 1931

1,808,046

UNITED STATES PATENT OFFICE

HEINRICH KÜCHENMEISTER, OF BERLIN, GERMANY

FILM OF MAGNETIZABLE MATERIAL FOR EPISCOPIC PROJECTION

Application filed January 30, 1928, Serial No. 250,734, and in Germany February 7, 1927.

My invention relates to films and it is an object to provide a film of magnetizable material instead of celluloid or the like, for episcopic projection which film carries a magnetically recorded record as well as a plurality of other kinds of records. These other kinds of records may be placed on the film overlying the magnetic record in order to effect a saving in space. A suitable material for the film is steel.

It has already been proposed to provide celluloid films with narrow steel borders. This involves the drawbacks that a durable connection between materials of so heterogeneous a character as celluloid and steel is very difficult, that the thickness of the films, and particularly at the connection of the celluloid and the steel strips, is considerable, that the widths of such combined films exceeds the normal width and consequently the normal film feeding appliances cannot be used for them, and that the steel borders must be rather narrow and each is able to receive only a single magnetic record.

The necessity of operating with reflected light in metal films is not a drawback as no difficulties are involved.

A film of magnetizable material, as steel, nickel, or the like, possesses the advantages of maximum strength, comparative lightness, and absolute noninflammability, and the further advantage that sound records can be made on the film by magnetic means.

Magnetizable materials, as steel, are so strong as compared with the usual film materials, and their thickness may be reduced to such an extent that they may even be lighter but still considerably stronger than normal films, and their life is practically unlimited. For the above reasons, the volume of a reel of steel or other magnetizable material is smaller than that of a celluloid film of equal length. Steel has the further advantage that it can be highly polished and so is favourable as to light reflection.

Obviously, sound records on the surface of the film may be wholly or partly made by photographic means, or two methods may be combined, to wit, etching or engraving, and photographing. It is also possible to combine several phonogrammes distorted in phase which are reproduced simultaneously in order to improve the effect, as is known to those skilled in the art.

With the use of a magnetizable film the recording of magnetogrammes may be utilized with a great saving in space. Due to the fact that magnetogrammes are invisible they may be applied in any position and extend all over the width of the film without interfering with the reproduction of those records recorded on the surface of the film. There may be a plurality of these records on the surface and they may be of various kinds such as pictures, photographically recorded sound records, magnetically recorded sound records, or sound records recorded in any other known manner. The above arrangement is not only convenient but also saves space, as a plurality of phonogrammes, each for a given group of sounds, may be arranged on a film of standard size. It has already been proposed to arrange a plurality of phonogrammes beside the pictures but this required a film the width of which is far beyond that of the normal film, or a separate phonogramme film and separate means for operating the films in synchronizing relation.

Records may be made on the steel band by any suitable method, as etching, engraving, brushing, etc., and a suitable coating will be applied to the film if necessary.

In order to illustrate my invention, reference is made to the accompanying drawings in which Fig. 1 is a view of my film carrying one type of sound record on its surface;

Figure 1:
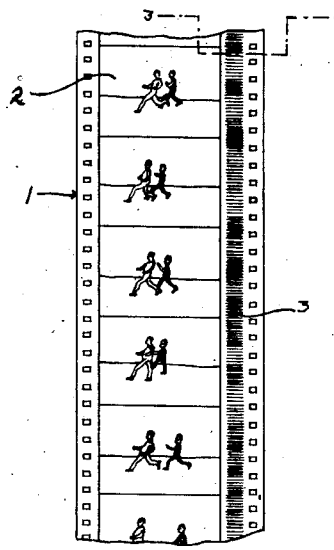
Figure 3:
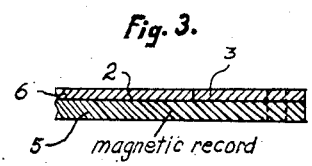
Fig. 3 is a section on an enlarged scale taken along line 3—3 of Fig. 1.
Figure 2:
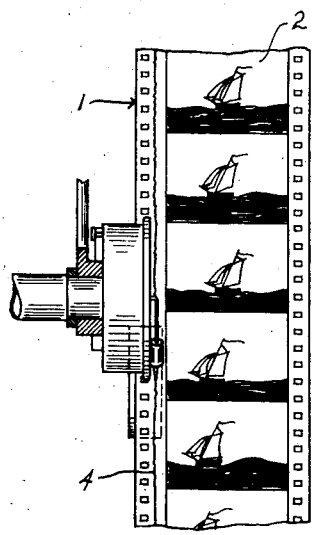
Fig. 2 is a view of my film with another type of sound record on its surface, and

My film 1 comprises a steel band 5 which carries on its surface a plurality of records. These may consist of a picture record 2 and a photographically recorded sound record 3, both adapted for episcopic projection as shown in Fig. 1. The sound record on the surface however may be a mechanically recorded groove 4 as shown in Fig. 2. The sound recorded by groove 4 will of course be reproduced in the conventional manner. A magnetically recorded sound record is placed on the band 5 and since it is invisible may be spread out over the entire surface of the film band. Thus although the entire surface of the film is utilized by the records recorded thereon, yet the additional magnetic record is obtained without any increase in the width of the film and without interference between this magnetic record and the other records on the film. A plurality of magnetic records may be placed on the film in this manner. A coating 6 may be provided on the film band 5 in order to receive the records on the surface of the film. As shown in Fig. 3 this coating 6 contains the picture record 2 and the sound record 3.

Various changes may be made in this embodiment of my invention within the scope of the appended claims.

I claim:

1. A moving picture and sound record band consisting of a metal band having a magnetic sound record, and of a coating extending over the surface of said band, said coating being provided with photographic sound and picture records for episcopic projection, at least one of said last two records overlying said magnetic record.

2. A moving picture and sound recording metal band, said band being provided with a magnetic sound record and having upon its surface a sound record groove overlying said magnetic record.

3. A record band according to claim 1, the sound records on said band being displaced with respect to their phases.

4. A metal film band according to claim 2, the sound records on said band being displaced in phase.

5. A moving picture and sound record band consisting of a metal band having a magnetic sound record and having upon its surface an engraved sound recording groove overlying said magnetic record.

6. A moving picture and sound record band consisting of a metal band having a magnetic sound record and having a coating upon its surface, said coating being provided with a mechanically produced sound record overlying said magnetic record.

7. A metal band according to claim 6, said sound records being displaced in phase.

8. A moving picture and sound record band having a plurality of phase displaced magnetic sound records and a coating on the surface of said band, said coating being provided with a plurality of photographic records for episcopic projection, at least one of said photographic records overlying one of said magnetic sound records.

9. A film having a magnetic record and a separate record on the surface thereof overlying said magnetic record.

10. A film of magnetizable material having a magnetic record and a separate record on the surface of said film overlying said magnetic record.

11. A film having a magnetic record and a plurality of separate records on the surface thereof for episcopic projection, at least one of said records overlying said magnetic record.

In testimony whereof I affix my signature.

HEINRICH KÜCHENMEISTER.